Patented Apr. 26, 1932

1,855,384

UNITED STATES PATENT OFFICE

HAROLD C. CHEETHAM, OF BLOOMFIELD, NEW JERSEY, ASSIGNOR TO BAKELITE CORPORATION, A CORPORATION OF DELAWARE

PLASTIC COMPOSITIONS AND METHOD OF PREPARING SAME

No Drawing.  Application filed May 11, 1925. Serial No. 29,621.

This invention relates to plastic compositions comprising a phenolic condensation product and a filler, the latter usually of fibrous nature, and to methods of preparing such compositions. The invention also comprises a stable aqueous suspension or emulsion of a phenolic condensation product, useful in the preparation of such plastic compositions. The compositions according to the present invention may take the form of fibrous sheets impregnated with the phenol resin; or of loose fibers or fibrous masses similarly impregnated and adapted for use as molding mixtures and for similar purposes. I will describe the invention by reference to certain preferred embodiments thereof, it being understood however that the method, as well as the compositions, may be variously modified without departing from my invention.

A primary object of my invention is to distribute a phenolic resin over the surfaces of the fibers more uniformly than has heretofore been possible without the aid of alcoholic or other organic solvents for the resin. Several methods for effecting the distribution of the resin over the fiber without the use of organic solvents have been described in the past, such methods either involving the use of alkaline solutions of the resin (U. S. Patent 1,160,365) or depending upon a vigorous beating of a mixture of resin and fiber in water suspension (U. S. Patent 1,160,362). In all cases the resin, whether in alkaline solution or in aqueous suspension, has been thoroughly beaten in presence of the fiber.

I have found that decidedly better results as regards subdivision of the resin may be obtained if the resin is first beaten in presence of water, but in absence of the fiber, until the particles are reduced to colloidal dimensions or substantially so, as indicated by the formation of a stable emulsion. This beating I carry out in a "colloid mill" of any suitable type. Good results have been obtained for example with a Premier colloid mill, employing a clearance of 10 mils and a speed of 10,000 R. P. M. The object at this point is to secure a stable emulsion of the resin, and this is facilitated by the addition in suitable proportions of stabilizing or protective colloids, such for example as gum arabic, glue or the like. The production of a stable emulsion appears to be further somewhat facilitated by providing basic conditions or at least non-acid conditions, as for example by the addition in small proportions of ammonia or hexamethylenetetramine to the aqueous solution. My method is therefore applicable with special advantage to reactive phenolic resins which have been prepared with ammonia as a catalyst; and also to the so-called potentially reactive phenol resin compositions which comprise a resin of the non-reactive type together with hexamethylenetetramine or equivalent methylene-containing body as a hardening agent. The method is however broadly applicable to phenolic resins however prepared, and whether of the reactive or non-reactive type.

Attempts to produce an equally satisfactory emulsion in presence of the fiber have not been successful, partly because the clearance of the colloid mill cannot be sufficiently reduced if any considerable amount of fiber is present; and second because the fibers appear to take up the particles of resin before the latter reach colloid dimensions, whereby their further reduction in size is prevented.

Following are specific examples, it being understood that they are illustrative only, and not restrictive:

1. A reactive phenol resin, which may be of the liquid type, is prepared by known methods: 33 parts by weight of this resin are added to 66 parts of water, together with 7 parts of gum arabic, and the mixture passed through the colloid mill, yielding a milky, mobile, non-sticky substantially neutral liquid, which is a stable emulsion and may be diluted to any extent with water. Properly prepared emulsions withstand boiling temperatures, but the resin may be precipitated by certain electrolytes, among which ferric chloride, alum and tribasic sodium phosphate have proven effective. The emulsions may also be broken by certain additions which are not electrolytes, as for example gas-black. Such reagents as are capable of breaking the emulsion will be referred to herein simply as "precipitants".

2. A non-reactive phenol resin is melted, and 50 parts by weight are stirred into 50 parts of warm water containing in solution 7 parts of gum arabic, and the mixture is run through the colloid mill which has been preliminarily warmed. The resulting emulsion is very fluid and stable, and sufficient hexamethylenetetramine to render the resin reactive may be dissolved in it without danger of precipitation.

Such emulsions may be employed in various ways. For example, they may be used, like alcoholic varnishes, for coating the fibres contained in sheets of paper, woven fabric and the like; and these sheets may be superposed and consolidated by hot-press molding to form composite or laminated sheets, tubes or other forms, as is now understood in this art.

Or a fibrous material such as wood flour, sulfite pulp, asbestos pulp or the like may be thoroughly beaten with the emulsion, using any desired proportions of fiber to resin; and the resin may then be precipitated on the fiber by such precipitants as are mentioned above. The resulting pulp may be run onto a screen for the preparation of sheets, which may then be dried; or the water may be removed from the pulp by draining, pressing or drying, or any combination of these, and the dry mixture applied in the usual hot-press or cold-press molding operations.

It is advantageous, more especially in the use of the non-reactive resins, to add a certain proportion of phenol or cresol to the aqueous suspension either of the resin, or of the fiber, or both, in order to avoid loss of the normal phenol content of the resin, with loss of plasticity, as more fully described in the application of Redman and Cheetham, Serial No. 620,823 filed February 23, 1923. An advantageous manner of operation is as follows: An emulsion of a non-reactive resin is prepared as described above. The fiber, whether cellulosic or asbestos, is thoroughly beaten in water containing appropriate concentrations of phenol or cresol, hexamethylenetetramine in proportion to render the resin potentially reactive, dye, and alum or other precipitant. The resin emulsion is then added, and being capable of dilution, distributes itself uniformly throughout the mass, and then slowly precipitates upon the fibers owing to the action of the alum or other precipitant. The mix is then run onto the paper screens in the usual manner, the aqueous liquid being re-used to conserve its soluble contents.

Phenol resin emulsions prepared as above may have an average particle size of the order of 5 microns (=.0005 cm.) as compared with an average particle size of .01 cm. for powders passing a 100 mesh standard copper screen; from which it will be evident that the opportunity for securing a perfect distribution of the resin is vastly greater in the case of the emulsions,—being comparable in fact with alcoholic solutions in this respect, with the advantage, among others, of not using an expensive solvent. For impregnation of paper and canvas I have found that emulsions may be used in accordance with the procedures and with the equipment now employed with alcoholic varnishes. The resin emulsions are absorbed and held by the paper in substantially the same manner and proportions as are the alcoholic solutions.

The emulsions may be prepared from the molten resins as discharged from the still, thus saving the time and cost of evaporating to dryness, cooling and grinding. In the case of molding mixtures the usual additions (pigments, stearic acid, etc.) may be better distributed through the mixes by being run through the colloid mill with the resin.

One advantageous application of the invention is the impregnation of asbestos or cellulose fibers for hot or cold molding mixes. Since soft, sticky or even liquid resins, whether reactive or non-reactive, are as readily emulsified as the brittle resins (which latter are alone suitable for ball-milling operations) these emulsions offer possibilities of preparing superior cold-molding compositions, where covering power with small proportions of binder and pigment, and cheapness of materials, are important factors. In case creosote oil or other lubricants are desired in the mix they may be added to the resin and emulsified with it, whether soluble or not. Because of the ease of dilution of the emulsions with water, and the readiness with which they are mixed with other emulsions of oils, rubber latex, hydrocarbons, rosin, rosinates and the like, insuring a very uniform mixing of a small proportion of binder with such fillers as wood flour, asbestos, news print and the like, the method offers many advantages in the manufacture of good but inexpensive mixes.

Certain advantages possessed by the above described colloidal suspensions of phenolic resins, as compared with alcoholic or other solutions of the same, employed as impregnating or coating materials, may be summarized as follows:

1. Elimination of fire hazard.
2. The saving of the cost of expensive organic solvents, and of the equipment for recovering them.
3. Upon evaporation the resin is deposited in the form of minute discrete particles, rather than as a continuous film; this permits a readier escape of the vapors, or in other words a quicker and more complete drying out of the product.
4. In the case of coated sheets there is little or no tendency to the formation of surface blisters, since there are no continuous films.
5. Experience has shown that water is not retained by the resin with the same tenacity as are organic solvents; it is hence more easily and completely eliminated, either before or after molding.

6. Small percentages of water do not paralyze or retard the transformation of the reactive resin, as do alcohol and the organic solvents.

7. The aqueous colloidal suspension is non-viscous, and is therefore not subject to alterations in viscosity due to evaporation, as is the case with alcoholic and other solutions, which is of great advantage in coating, impregnating and similar operations.

8. Colloidal suspensions have been found to afford a more constant fiber-resin ratio throughout the finished article or sheet than is attainable with true solutions. Such solutions tend to deposit resin at and near the surface from which the solvent evaporates, resulting in a local concentration of resin at such surfaces. Colloidal suspensions do not exhibit this tendency.

The consequence of the foregoing several advantages is a marked and material technical advance due to the use of colloidal suspensions, as compared with the solutions or varnishes as heretofore employed.

The term phenol resin is used broadly herein to include resins of the non-reactive and the reactive types, it being well understood by those skilled in this art that a non-reactive resin, or a partially reactive resin, in association with a suitable hardening agent such as hexamethylenetetramine or other aldehyde derivative, or body containing a mobile methylene group, is a potentially reactive composition; and the term plastic composition is employed to cover all fiber-resin compositions, whether in the form of paper, of fabric, or of such pulverulent, granular or sheet mixtures as are commonly used in the molding art, whether according to the known hot-molding or cold-molding procedures.

While I have described the invention with reference to plastic compositions containing a fibrous filler, it is to be understood that other types of filler, either inorganic or organic may be employed if desired.

The term "suspension" is used in the claims to denote the mobile, milky, non-sticky, substantially neutral aqueous liquids containing discrete particles of phenol resins in a liquid, semi-solid or solid condition such as are obtained by dispersing phenol resins in an aqueous medium in accordance with the invention.

I claim:

1. The method of making a plastic composition containing a phenol resin and a fibrous filler, comprising preparing aqueous suspensions containing respectively the phenol resin in suspension and the fiber, then commingling said suspensions, and eliminating water.

2. The method of making a plastic sheet comprising preparing aqueous suspensions containing respectively a phenol resin in suspension and a fiber, then commingling said suspensions, laying the mixture into a sheet, and drying the same.

3. As a new article of manufacture, a phenol resin in suspension in an aqueous medium.

4. As a new article of manufacture, a phenol resin in suspension in an aqueous medium in association with a protective colloid.

5. As a new article of manufacture, a phenol resin in suspension in an equeous medium containing a hardening agent for the resin.

6. As a new article of manufacture, a phenol resin in suspension in an aqueous medium containing hexamethylenetetramine.

7. As a new article of manufacture, a plastic composition comprising a fibrous substance having distributed thereon phenol resin particles derived from a substantially neutral suspension.

8. As a new article of manufacture, a plastic composition comprising a fibrous substance having distributed thereon phenol resin particles derived from a substantially neutral suspension and associated with a protective colloid.

9. As a new article of manufacture, a plastic composition comprising a fibrous substance in sheet form having distributed thereon phenol resin particles derived from a substantially neutral suspension.

10. As a new article of manufacture a plastic composition comprising a fibrous substance and discrete particles of a phenol resin.

11. As a new article of manufacture a plastic composition comprising a fibrous substance having distributed thereon phenol resin particles precipitated by means of carbon black from a substantially neutral suspension.

12. As a new article of manufacture a plastic composition comprising a fibrous substance having distributed thereon phenol resin particles precipitated by means of carbon black from a substantially neutral suspension and associated with a protective colloid.

13. As a new article of manufacture a plastic composition comprising a fibrous substance in sheet form having distributed thereon phenol resin particles precipitated by means of carbon black from a substantially neutral suspension.

14. As a new article of manufacture a plastic composition comprising a fibrous substance, carbon black, and discrete particles of a phenol resin.

15. The method of making a plastic composition containing a phenol resin and a filling material comprising first preparing an aqueous suspension of the resin, then absorbing the suspension in the filling material, and drying the product.

16. The method of making a plastic composition containing a phenol resin and a filling material comprising first preparing an aqueous suspension of the resin, then absorbing the suspension in the filling material, and precipitating the resin thereon, and drying the product.

17. In a method of making a plastic composition, the step of precipitating a phenol resin from a pre-formed suspension thereof upon a fibrous substance.

In testimony whereof, I affix my signature.

HAROLD C. CHEETHAM.